US006713447B2

(12) United States Patent
Beaudoin et al.

(10) Patent No.: US 6,713,447 B2
(45) Date of Patent: Mar. 30, 2004

(54) METHOD FOR PURIFYING MARINE MAMMAL OIL ENRICHED IN OMEGA 3 FATTY ACIDS AND COMPOSITIONS COMPRISING SAME

(75) Inventors: Adrien Beaudoin, Rock Forest (CA); Geneviève Martin, Quebec (CA)

(73) Assignee: Universite de Sherbrooke (CA)

( * ) Notice: Subject to any disclaimer, the term of this patent is extended or adjusted under 35 U.S.C. 154(b) by 27 days.

(21) Appl. No.: 10/148,039

(22) PCT Filed: Dec. 4, 2000

(86) PCT No.: PCT/CA00/01466
§ 371 (c)(1),
(2), (4) Date: Oct. 7, 2002

(87) PCT Pub. No.: WO01/40418
PCT Pub. Date: Jun. 7, 2001

(65) Prior Publication Data
US 2003/0120097 A1 Jun. 26, 2003

(30) Foreign Application Priority Data
Dec. 2, 1999 (CA) .............................................. 2290885

(51) Int. Cl.$^7$ ............................................ A01N 37/18
(52) U.S. Cl. .............................. 514/2; 554/8; 554/224; 426/417; 426/601
(58) Field of Search ................... 554/8, 224; 514/2; 426/417, 601

(56) References Cited
FOREIGN PATENT DOCUMENTS

| GB | 446997 | A | | 5/1936 |
|----|--------|---|---|--------|
| GB | 470223 | A | | 8/1937 |
| GB | 470223 | | * | 8/1937 |
| GB | 711352 | A | | 6/1954 |
| JP | 907500 | A | | 3/1997 |
| SU | 464611 | A | | 6/1975 |

OTHER PUBLICATIONS

Rzhavskaya F., "Composition and oxidation of cetacean blubber according to method separation", FSTA Online Database, 71-1-12-R0503, v.47, 2, 1971, pp. 68-72.

Shahidi F. et al, "Effects of processing and sqalene on composition and oxidative stability of seal blubber oil", J. Food Lipids, v. 6, 2, 1999, pp. 159-172.

Bowyer, D. et al., The Determination of the Fatty Acid Composition of Serum Lipids Separated by Thin-Layer Chromatography; and A Comparison with Column Chromatography, Biochim. Biophys. Acta, 70 (1962) pp. 423-431.

Folch, J. et al., A Simple Method for the Isolation and Purification of Total Lipides from Animal Tissues, J. Biol. Chem. 226 (1957), pp. 497-509.

Bernfeld, P., Enzymes of Starch Degradation and Synthesis, Advances in Enzymology, vol. XII (1951), pp. 379-427, Interscience Publishers, New York.

Nagendrappa, G. et al., Chloramine T with Iodine: A New Reagent to Determine the Iodine Value of Edible Oils, JAOCS, 75, No. 9 (1998), pp. 1219-1221.

Church, F., et al., Spectrophotometric Assay Using o-Phthaldialdehyde for Determination of Proteolysis in Milk and Isolated Milk Proteins, J. Dairy Sci. 66 (1983), pp. 1219-1227.

* cited by examiner

Primary Examiner—Deborah Carr
(74) Attorney, Agent, or Firm—Akerman Senterfitt

(57) ABSTRACT

The present invention relates to a method for purifying marine mammal oil enriched in omega 3 fatty acids and to compositions comprising such oils. The invention also relates to a method of preparing such oils from the seal and other marine mammals. More particularly, the present invention relates to a process for the transformation of subcutaneous and muscular tissues from the seal and other marine mammals. Even more particularly, the present invention relates to a process for obtaining lipid and protein extracts from the carcasses of seal and other marine mammals and to these extracts. In addition, the invention relates to fractions obtained by the methods of the present invention and to food supplements comprising same.

24 Claims, 3 Drawing Sheets

METHOD FOR PURIFYING MARINE MAMMAL OIL ENRICHED IN OMEGA 3 FATTY ACIDS AND COMPOSITIONS COMPRISING SAME

This application is a 371 of PCT/CA00/01466 filed Dec. 4, 2001.

FIELD OF THE INVENTION

The present invention relates to a method for purifying marine mammal oil enriched in omega 3 fatty acids and to compositions comprising such oils. The invention also relates to a method of preparing such oils from the seal and other marine mammals. More particularly, the present invention relates to a process for the transformation of subcutaneous and muscular tissues from the seal and other marine mammals. Even more particularly, the present invention relates to a process for obtaining lipid and protein extracts from the carcasses of seal and other marine mammals and to these extracts. In addition, the invention relates to fractions obtained by the methods of the present invention and to food supplements comprising same.

BACKGROUND OF THE INVENTION

Seals have been hunted for their fur and their meat for hundreds of years. Recently, these animals have been hunted mainly for their fur and blubber oil, the residual carcass often being thrown back to the sea. There is thus a often, a very significant waste of seal tissue.

The entire seal trade hopes to find a growing market for seal meat, seal fat products, and in the case of the Asian market, seal-genitalia based aphrodisiac products. A renewed interest for seal oil has recently emerged, because of the properties of seal oil extracted from the blubber which is enriched in omega-3 fatty acids. Seal oil is a typical marine, because it is enriched in omega-3 fatty acids. More specifically it contains docosahexaenoic acid (DHA) and eicosapentaenoic acid (EPA) the beneficial properties of which are well known to those in the art. In addition, these oils contain considerable levels of squalene and Vitamin E. These compounds are essential to the development and the maintenance of good health. In fact, over the past twenty years, health experts have recommended diets lower in saturated fats and higher in polyunsaturated fats. While this advise has been followed by a number of consumers, the incidence of heart disease, cancer, diabetes and many other debilitating diseases has continued to increase steadily. Scientists agree that the type and source of polyunsaturated fats is as critical as the total quantity of fats. The most common polyunsaturated fats are derived from vegetable matter and are lacking in long chain fatty acids (e.g. Omega-3). In addition, the hydrogenation of polyunsaturated fats to create synthetic fats has contributed to the rise of certain health disorders and exacerbated the deficiency in some essential fatty acids. Indeed, many medical conditions have been identified as benefiting from an Omega-3 supplementation. These include acne, allergies, Alzheimer's, arthritis, artherosclerosis, breast cysts, cancer, cystic fibrosis, diabetes, eczema, hypertension, hyperactivity, intestinal disorders, kidney dysfunction, leukemia, and multiple sclerosis. Of note, the World Health Organization has recommended that infant formulas be enriched with Omega 3 fatty acids.

The conventionally used polyunsaturates are those derived from vegetable oils, which contain significant amounts of omega 6 but little or no omega 3. While omega 6 and omega 3 fatty acids are both necessary for good health, they must be consumed in a balance of about 4:1. Today's Western diet has created a serious imbalance with current consumption on average of 20 times more omega 6 than omega 3. Concerned consumers have begun to look for health food supplements to restore the equilibrium. The three principal sources of omega 3 are flaxseed oil, fish oils, and seal oil. The past decade has seen rapid growth in the production of flaxseed and fish oils. Both types of oil are considered good dietary sources of polyunsaturated fats but are less effective than seal oil in supplying omega 3 fatty acids. Flaxseed oil contains no EPA, DHA, or DPA but rather contains linolenic acid—a building block enabling the body to manufacture EPA. There is evidence however that the rate of metabolic conversion can be slow and unsteady, particularly among those with impaired health. Fish oils vary considerably in the type and level of fatty acid composition depending on the particular species and their diets. For example, fish raised by aquaculture tend to have a lower level of omega 3 fatty acids than that in the wild. Research has shown that seal oil is more beneficial to those at risk of heart disease and diabetes than is fish oil. Scientists postulate that this stems from the relative absence of DPA in fish oil and the slower rate at which the body is able to extract and utilize the EPA and DHA content of fish oil.

The richest, most direct and complete source of Omega 3 oils is found in the blubber of certain marine mammals and especially in the Harp Seal. In addition, the body's absorption of omega 3 from seal blubber is faster and more efficient than from flaxseed and fish oils. This is due, in part, to the molecular configurations of the EPA and DHA in seal oil, which varies slightly from those found in fish oils.

Traditionally seal oil has been extracted by processes requiring high temperatures which favor oxidation of polyunsaturated fats.

Methods of the prior art which describe methods for extracting oil from marine mammals require heating. For instance, GB-A-711 352 describes a method for extracting oil from vegetable and animal material including whale liver and meat. The material is preferably heated at a temperature of around 60° C. to 80° C. to reduce the viscosity of the mixture and to perform two tasks: 1) enable a better extraction of the oil; and 2) obtain a better atomization of the proteins during homogenization. Similarly, XP-002164137 describes a method of extracting sperm whale fat which require heating the material to 45° C. to 55° C. Also, GB-A-470,223 teaches a method of extracting oil from whale blubber which require heating at 45° C. to 55° C.

Other methods of extracting oil from marine mammals require the use of toxic solvents. For instance, XP-002164136 describes a method of extracting oil from whales or seals comprising the use of such toxic solvents such as chloroform and methanol.

The oil of marine mammals, such as seal thus provides significant advantages. Unfortunately, simple and cost-effective processes for the purification of oil from such marine mammals have not been provided. In addition, processes enabling a purification of oil containing a significant amount of Omega 3 fatty acids, from fat tissues, active protein fractions, and lipids from muscle and visceral tissues have yet to be provided. Furthermore, in view of the significant decrease in the price of seal pelt (about 50% in the last year) and of the very low price of marine mammal carcasses (from the 1997 Newfoundland and Labrador Seafood Industry, Newfoundland Department of Fisheries and Aquaculture), there is a need to increase the value of marine mammals (seals in particular), body parts and more particularly of their carcasses.

There also remains a need to find a utility and/or interest for the proteins of the carcasses of marine mammals such as that of the seal.

In view of the reported health benefits for Omega 3-containing fatty acids, there remains a need to provide extracts containing significant quantities thereof, means to prepare same by a simple and cost-effective method and to provide food supplement comprising such extracts.

The present invention seeks to meet these and other needs.

The present description refers to a number of documents, the content of which is herein incorporated by reference in their entirety.

SUMMARY OF THE INVENTION

The invention concerns a method for obtaining and purifying a marine mammal oil enriched in omega 3 fatty acids, which overcomes the drawbacks of the prior art. More particularly, the invention concerns a process for the purification of oil enriched in omega 3 fatty acids from seal tissue, fractions comprising such oil, and food supplements comprising same. In a particular preferred embodiment, the seal tissue is the blubber, which yields a significant quantity of oil.

The present invention further relates to a process of extracting omega 3-containing fatty acids from a marine mammal, which allows the recovery of blubber oil under conditions that preserve its quality. More particularly the method of extraction of omega 3 fatty acids reduces the oxidation of polyunsaturated fats. The process further allows the recovery of lipids from other tissues as well as a protein isolate from the carcass. By using the carcass as substrate far the extraction and purification, the instant process provides a significant value addition in addition to enabling a more environment friendly disposal of carcasses and undesired tissues form marine mammals. Indeed, the present invention enables a recycling of marine mammal tissues which are often discarded.

More particularly, in one preferred embodiment, the invention relates to a process for the transformation of the seal and related species according to which the subcutaneous fat tissues thereof are extracted by "cold pressure" in the absence of solvent.

In a particularly preferred embodiment of the present invention, the process further comprises a second step which allows the recovery of proteins from muscles and other tissues of the seal by a solvent extraction. In an especially preferred embodiment, the solvent is chosen from acetone, alcohol, ethanol, ethyl acetate or a combination of at least two such organic solvents. The lipids extracted by the solvent or solvents extraction in this second step, are recovered by evaporation of the solvent or solvents. The process comprising the second step allows the recovery of a significantly pure protein fraction, devoid of significant levels of heavy metals or pesticides (which are not precipitated along with the proteins).

Non-limiting examples of organic solvents which can be used in accordance with the present invention are well-known in the art and include alcohol (e.g. isopropanol, propanol and the like). Of course, it is preferred to use solvents which are non-toxic to animals (such as, for example, methanol).

The term "animal" refers broadly to the animal kingdom and thus to mammals, fish, birds and the like.

The methods of the present invention enable the production of omega 3 enriched oil from fat tissue, the obtention of substantially pure protein fractions which have retained enzymatic activity, and lipids from muscles and visceral tissues (tissues which are traditionally thrown away).

In a number of preferred embodiments, the present invention relates to seal as the marine mammal from which the extracts or fractions are prepared.

In one embodiment of the present invention, upon killing of the marine mammal having fatty acids enriched in omega 3, the mammal is immediately bled and its skin removed. Subcutaneous fat and other fat tissues are excised and kept at very low temperatures. Preferably the temperature is between about 0° C. and about 10° C. and more preferably between about 0° C. and about 4° C. Oil is extracted by exerting a physical pressure on the fat. In a particular embodiment, the oil is extracted by grinding and by applying high pressure on the tissues (cold extraction). In such a process, the fat melts into the oil, which is then recovered by filtration or centrifugation.

In a particular embodiment, the oil is purified by conventional means such as, for example, filtration and/or centrifugation. In addition, the water in the oil can be collected along with any volatile compound therein by heating as conventionally known.

In another preferred embodiment of the present invention, the other tissues from the carcass, including viscera, are grinded and extracted with cold acetone and/or ethanol. After washing of the insoluble matter, the solvent is removed from the extracts under low pressure leaving a protein concentrate retaining some active enzymatic activities and no significant level of bacterial contamination. The solvent soluble material (lipid phase) is recovered following evaporation and separation from tissue water.

In accordance with one embodiment of the present invention, there is therefore provided a method of extracting oil enriched in omega 3 fatty acids from a marine mammal comprising a lipid extraction step which comprises a submitting of a tissue from the marine mammal to a cold pressure treatment of the tissue, whereby the cold pressure treatment enables the obtention of an oil enriched in omega 3 fatty acids and which minimizes the oxidation of polyunsaturated fats, and wherein the lipid extraction step is carried-out in the absence of an organic solvent.

In accordance with another embodiment of the present invention, there is also provided a marine mammal oil enriched in omega 3 fatty acids, obtained according to the method of the present invention.

In accordance with yet another embodiment of the present invention, there is provided a food supplement composition, comprising the marine mammal oil of the present invention, together with a suitable carrier. Suitable carriers are well-known in the art.

In accordance with another embodiment of the present invention, there is also provided a marine mammal oil enriched in omega 3 fatty acids which is devoid of traces of organic solvent.

As used herein, the designation "blubber oil", or "blubber" as known to the person of ordinary skill denotes the subcutaneous adipose tissue.

The term "cold pressure" is a well-known terminology in the art which refers to exerting a physical pressure on the fat at low temperature (see above).

As used herein, the terminology "significantly pure protein fraction" or the like is meant to refer to a protein fraction or protein preparation which contains at least about 90% protein, preferably at least about 95% of protein. Similarly, the terminology "substantially pure protein fraction" or the like refers to a protein fraction being at least 90% pure, preferentially at least 95% pure and particularly preferably at least 99% pure.

The terminology "devoid of significant levels of heavy metals or pesticides" is meant to refer to levels of pesticides or heavy metals lower than the approved standards from regulatory branches (e.g. Health Canada [e.g. The Food and Drug Act and Regulations], the Food and Drug Administration [USA] and the like).

While the process and extracts of the instant invention are demonstrated with seal tissues, marine mammals in general, having fatty acids enriched in Omega 3, could be used in the processes of the present invention. Such marine mammals are known in the art. Non-limiting examples thereof include cetacean (e.g. whales), elephant seal, seals, walrus and the like. It shall thus be understood, that the person of ordinary skill, will be able to adapt the teachings of the present invention to prepare oils, proteins and lipids from such marine mammals.

In a preferred embodiment of the instant invention, the marine mammal having fatty acids enriched in Omega 3 is the seal. The term "seal" is used herein broadly to refer to a number of species. Non-limiting examples of species present in the Atlantic ocean include, the Harp Seal, the Hooded Seal (*Cystophora cristata*), the Ringed Seal (*Pusa hispida*), the Harbor Seal (*Phoca vitulina,* also found in the Pacific Ocean), the Grey Seal (*Halichoerus grypus*), and the Bearded Seal (*Erignathus barbatus*).

Of note, health experts have concluded that 80% of all Americans exhibit a deficiency in essential fatty acids. Some signs and symptoms typical but not exclusive to a deficiency in essential fatty acids are fatigue, depression, dry skin and hair, dry mucous membranes, cracked nails, indigestion, constipation and lack of endurance. Long term deficiency is associated with a higher risk of chronic degenerative diseases. As many as 60 medical conditions are linked to this deficiency or alternatively have been identified as benefiting from Omega-3 supplementation. These include acne, allergies, Alzheimer's, arthritis, artherosclerosis, breast cysts, cancer, cystic fibrosis, diabetes, eczema, hypertension, hyperactivity, intestinal disorders, kidney dysfunction, leukemia, multiple sclerosis, myopathy, obesity, psoriasis, and vascular disease. Seal oil is proven to lower serum cholesterol without the side effects associated with prescription drugs and its ability to reduce platelets in the blood can serve as an alternative to aspirin in the prevention of stroke. The methods of the present invention and the fractions obtained thereby therefore find utility in a large number of deficiencies or disorders. The three most important of the long chain fatty acids are EPA, DHA, and DPA. These fatty acids have emerged from relative obscurity in the medical world to become one of the most important and fastest growing health supplements on the market today.

The present invention therefore also relates to compositions comprising one or more fraction in accordance with the present invention, to treat and/or protect against one or more of the deficiencies or conditions for which an omega 3 supplement is indicated and more particularly the deficiencies or conditions described above.

For administration to humans or other animals, the professional (medical professional or health food supplement expert) will ultimately determine the appropriate form and dosage for a given subject, and this can be expected to vary according to the chosen therapeutic or preventive, the response and condition of the subject, as well as the severity of the disease or conditions.

Composition within the scope of the present invention should contain the active agent (e.g. the oil enriched in omega 3 fatty acids) in an amount effective to achieve the desired therapeutic and/or preventive effect while avoiding adverse side effects. Since the oil of the present invention has a moderate to low level of vitamin A, high doses thereof can be administered (more than 100 ml). Of note, Eskimos are known to eat huge amounts of blubber, the equivalent of 250–500 ml of the oil in accordance with the present invention. Typically, the oil in accordance with the present invention can thus be administered to mammals (e.g. humans) in doses ranging from 2–10 ml daily of the oil in accordance with the present invention (based on an average person of 150 lbs.). Pharmaceutically acceptable preparations are within the scope of the present invention and are well known in the art (Remington's Pharmaceutical Science, 16th Ed., Mack Ed.). The protein fraction in accordance with the present invention can be used as a source of protein for fish, birds or mammals for example.

BRIEF DESCRIPTION OF THE DRAWINGS

Having thus generally described the invention, reference will now be made to the accompanying drawings, showing by way of illustration a preferred embodiment thereof, and in which.

Figure 1:
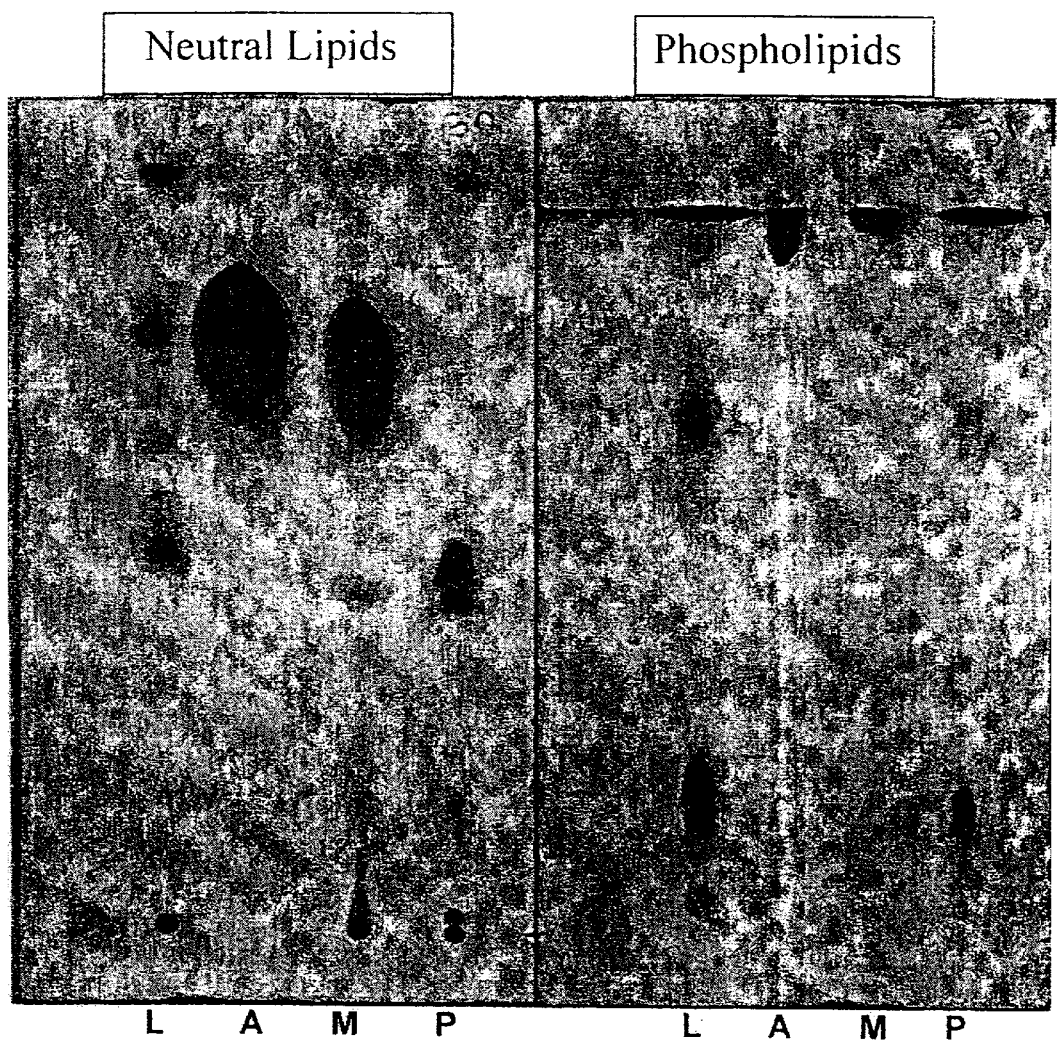
FIG. 1 shows a thin-layer chromatography of neutral lipids and phospholipids of blubber, liver, muscle and pancreas oil extracts.
Figure 2:
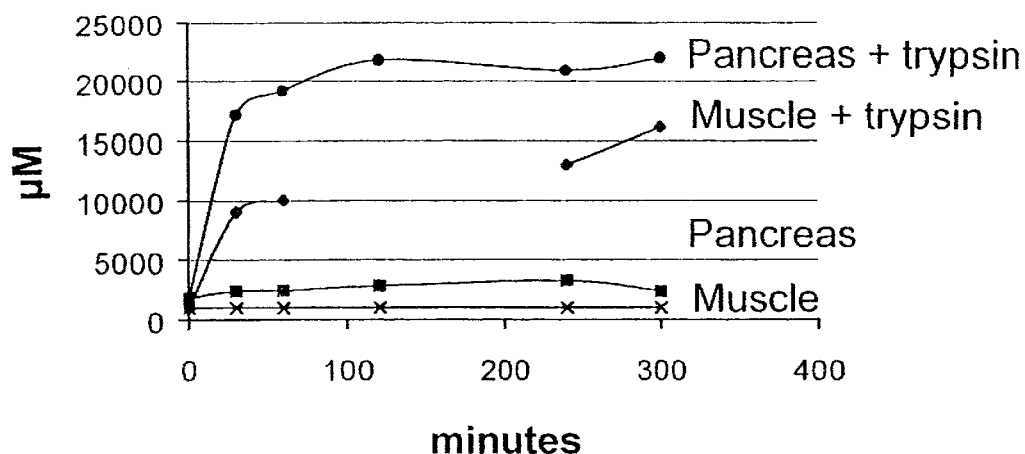
FIG. 2 shows the proteolytic activity of muscle and pancreas protein extracts.
Figure 3:
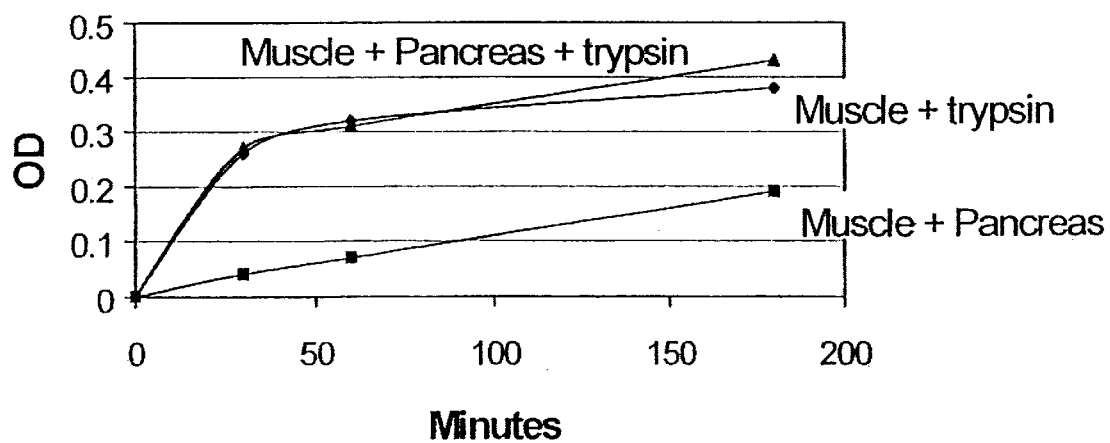
FIG. 3 shows the proteolytic activity of pancreas protein extracts on muscle protein extracts.
Figure 4:
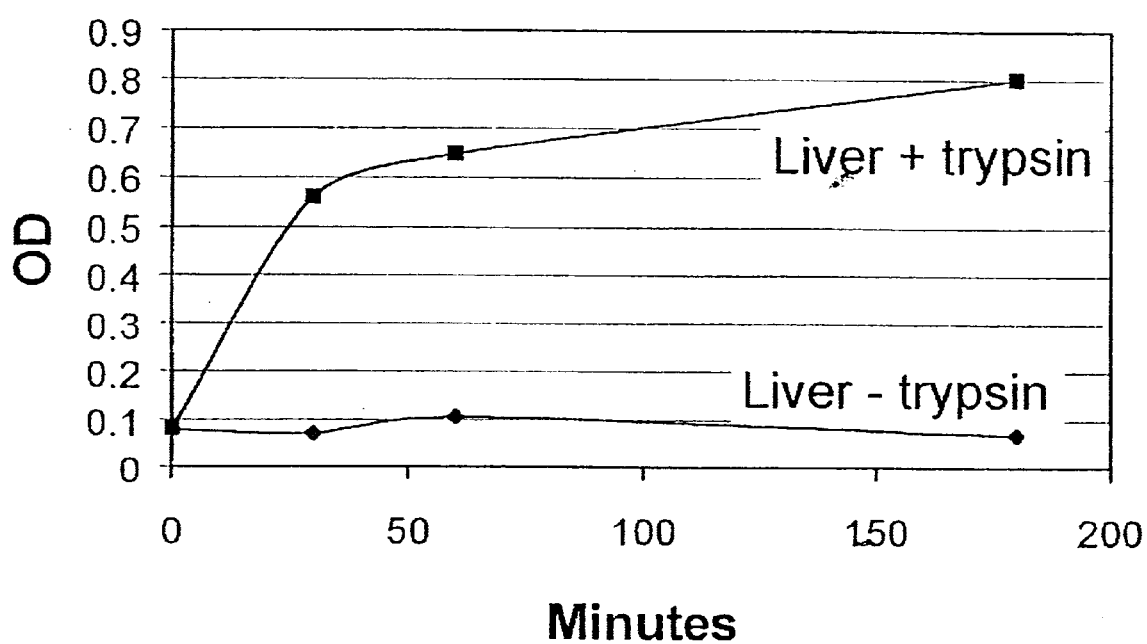
FIG. 4 shows the proteolytic activity of liver protein extracts.

Other objects, advantages and features of the present invention will become more apparent upon reading of the following non-restrictive description of preferred embodiments with reference to the accompanying drawing which is exemplary and should not be interpreted as limiting the scope of the present invention.

DESCRIPTION OF THE PREFERRED EMBODIMENT

Seal tissues were obtained and selected tissues were kept frozen separated at −20° C. All tissue sample preparations and lipid extractions were carried out at 4° C. Appropriate tissue samples were cut in pieces and forced through a meat grinder. Lipids were extracted from weighed grinded samples either by mechanical pressure or by dissolution in acetone for different periods of time, according to each tissue. Extracted lipids were separated from the non-lipid materials by centrifugation or by filtration depending on the tissue. The solvent-extracted lipids were recovered by evaporating the solvent in a Rotavaporm apparatus.

The general extraction methods described above were applied to specific seal tissues such as blubber, muscles, pancreas and liver.

Table 1 shows the yield of lipids extracted from muscle, pancreas and liver tissues. Yields of lipids of 2.6–3.0% were obtained after extracting overnight and a washing time of 30 minutes from pancreas and liver. In contrast, the extraction procedure from the blubber yielded at least 70% of translucent oil. The fact that the oil is translucent is another advantage of the process of the present invention. In addition, the oil from the blubber is not colored.

TABLE 1

Quantity of Lipids Extracted with Acetone with Different Periods of Extraction

| Tissue | Weight G | Extraction Time Hour | Washing Time Minutes | Amount of Lipids g | % |
|---|---|---|---|---|---|
| Muscle | 274 | 22.5 | 30 | 6.28 | 2.3 |
| Muscle | 257 | 19 | 30 | 6.93 | 2.6 |
| Muscle | 250 | 17 | 30 | 7.61 | 3.0 |
| Muscle | 250 | 3.5 | 20 | 4.70 | 1.9 |
| Pancreas | 109 | 2 | 15 | 2.03 | 1.9 |
| Liver | 151 | 1 | 15 | 2.25 | 1.5 |
| Muscle | 250 | 4 | 5 | 3.56 | 1.4 |

Table 2 shows the general composition of muscle tissue extracted according to one embodiment of the present invention. The procedure produces two successive lipid fractions and a dry residue enriched in proteins. Results summarised in Tables 1 and 2 show that the lipid recovery lies between 2.6–3.0%. To see if more lipids could be recovered, the muscle residue was washed with 100 ml of pure ethyl acetate. An additional 1.6–2.4% could be recovered.

TABLE 2

General Composition of Muscle Tissues

| | #1 | #2 |
|---|---|---|
| Moisture % | 70.8 | 70.5 |
| Dry matter % | 29.2 | 29.5 |
| Total Lipids % | 4.7 | 2.5 |
| Lipid fraction 1% | 4.6 | 2.3 |
| Lipid fraction 2% | 0.1 | 0.2 |
| Residue % | 24.5 | 27.0 |
| Residual lipids % | 2.4 | 1.6 |

A comparative extraction with the method of Folch (1957) shows that the recovery of total lipids from the muscles using the Folch procedure was slightly better, in terms of yield, than the instant method. However, the Folch method cannot be applied for the recovery of lipids for commercial uses because of its toxicity due to the use of methanol. The toxicity of methanol is well-known.

FIG. 1 and Table 3 show that the blubber lipids are 98% triglycerides. About half of the liver lipids are neutral with the free fatty acids (32%) as the main species and the other half being mainly composed of phosphatidyl choline (23%) and phosphatidyl ethanolamine (17%). About three quarters of the muscle lipids are neutral with the triglycerides (67%) comprising the majority of them, whereas the other quarter comprises sphingolipids/lysophosphatidyl choline (13%) and phosphatidyl choline (10%). In contrast, 44% of the pancreas lipids are free fatty acids and the major phospholipids are phosphatidyl choline (21%) and phosphatidyl ethanolamine (15%). No triglyceride were detected in the pancreas extract.

TABLE 3

Proportion of Lipid classes of Adipose, Liver, Muscle and Pancreas Oils

| Lipid Class | Adipose | Liver | Muscle | Pancreas |
|---|---|---|---|---|
| Total Neutral Lipids | 100.1 | 52.8 | 77.2 | 58.4 |
| Cholesteryl Ester | 0.4 | 5.7 | 1.0 | 5.3 |
| Triglcycerides | 98.6 | 12.4 | 66.6 | 0 |
| Free Fatty Acids | 0.7 | 31.8 | 7.1 | 43.8 |
| Mono- & Diglycerides | 0.4 | 2.8 | 2.7 | 9.3 |
| Total Phospholipids | 0 | 47.2 | 22.5 | 41.6 |
| Phosphatidic Acid | 0 | 1.3 | 0 | 0 |
| Phosphatidyl Ethanolamine | 0 | 16.7 | 0 | 14.6 |
| Phosphatidyl choline | 0 | 22.6 | 9.5 | 21.4 |
| Sphingolipids/Lysophosphatidyl choline | 0 | 4.6 | 12.9 | 5.7 |

Table 4 shows selected physical and chemical characteristics of blubber and muscle oils. The saponification and iodine values suggest that the lipids of both tissues contain short chain fatty acids and high levels of polyunsaturated fatty acids. Unsaturated fatty acids from the blubber are less peroxidized than the ones extracted from the muscles. Muscle oil contain 0.84% volatile matter and humidity. In contrast, no moisture and volatile matter could be detected in blubber oil. In fact, exposition to 125° C. oxidised the blubber oil readily. The fatty acid composition of both tissues are shown in Table 5. Both types of oil contain high proportions of 20:5 and 22:6 fatty acids (a characteristic of marine oils).

TABLE 4

Physical and Chemical Characteristics of Blubber and Muscle Oils

| | Blubber Oil | Muscle Oil |
|---|---|---|
| Iodine Value | 164 | 122 |
| Peroxide Value | 2.6 | 14 |
| Saponification Value | 191 | 199 |
| Free Fatty Acid Value | 1% | 6.6% |
| Moisture and Volatiles | <0.05% | 0.84% |
| Refractive Index (24° C.) | 1.4765 | 1.4789 |

TABLE 5

Compositon of Major Fatty Acids (mg/100 mg) of Blubber and Muscle Oils

| Fatty acid | Blubber | Muscle Fraction 1 | Muscle Fraction 2 |
|---|---|---|---|
| 14:0 | 5.5 | 5.2 | 0.7 |
| 16:0 | 12.7 | 19.5 | 27.2 |
| 18:0 | 1.1 | 3.3 | 8.1 |
| SATURATED | 21.9 | 29.1 | 36.1 |
| 16:1n-7 | 22.2 | 17.0 | 3.6 |
| 18:1n-9 | 13.1 | 16.7 | 23.4 |
| MONOUNSATURATED | 53.3 | 48.8 | 36.2 |
| 18:2n-6 | 0.9 | 1.2 | 2.0 |
| 20:4n-6 | 0.3 | 1.0 | 3.9 |
| n-6 PUFA | 1.5 | 2.5 | 6.1 |
| 18:3n-3 | 0.4 | 0.3 | 0.1 |
| 20:4n-3 | 0.2 | 0.3 | 1.5 |
| 20:5n-3 | 11.2 | 9.7 | 12.0 |
| 22:5n-3 | 3.3 | 2.6 | 1.5 |
| 22:6n-3 | 8.2 | 6.9 | 6.5 |
| n-3PUFA | 23.2 | 19.7 | 21.7 |

Protein residues obtained after lipid extraction may be useful as protein and enzyme sources. To verify this, amino acid composition of muscle proteins and the proteolytic and amylolytic activities of the protein residues were determined. Table 6 shows that all essential amino acids are present in the muscle proteins. However, only 10% of the muscle proteins are hydrosoluble. FIGS. 1 to 4 illustrate that the pancreas protein extracts contain some proteolytic activities, but that none of the liver and muscle protein extracts demonstrated significant activity.

TABLE 6a

Amino Acid Composition of Muscle Proteins

| Alanine | 0.66 |
|---|---|
| Arginine | 15.00 |
| Aspartate | 14.64 |
| Cysteine | 3.61 |
| Glutamique | 3.05 |
| Proline | 5.91 |
| Isoleucine | 8.25 |
| Leucine | 7.84 |
| Lysine | 1.18 |
| Methionine | 1.95 |
| Penylalanine | 1.21 |
| Histidine | 5.68 |
| Threonine | 0.44 |
| Tryptophane | 0.44 |
| Tyrosine | 6.23 |
| Valine | 7.12 |
| Glycine | 0.62 |
| Serine | 6.59 |

TABLE 6b

Balance sheet of the protein isolate

| Protein | 80.6% (94.5% on a dry weight basis) |
|---|---|
| Ashes | 5.2% |
| Water | 14.7% |

| Minerals % | |
|---|---|
| Calcium | 4.4 mg |
| Sodium | 116 mg |
| Potassium | 708 mg |
| Mercury | <0.02 mg |
| Cadmium | <0.01 mg |

Table 7 shows that the pancreas contains only weak amylolytic activities and is thus not a tissue of choice for purifying amylase. Nevertheless, it shows that marine mammal tissue can be used as a source of protein (in addition to oil enriched in omega 3) which retains enzymatic activity. Of course, the person of ordinary skill could use the pancreas of seal (or another organ) as a source of a protein known to be expressed therein.

TABLE 7

Amylolytic Activity of Pancreas Protein Extracts

| Tissue | Activity ($\mu$mole/min/mg) |
|---|---|
| Pancreas protein extract | 1.2 |
| Frozen pancreas | 1.2 |

The present invention is illustrated in further detail by the following non-limiting examples.

EXAMPLE 1

Extraction From the Blubber of Seal

The subcutaneous adipose tissue (blubber) was trimmed from contaminating dissected tissues. Blubber samples frozen at −20° C. were immediately grinded in a meat grinder at 4° C. and the oil extruded from the fat tissues using mechanical pressure. The "blubber oil" was recovered after centrifuging at 4000 rpm for 15 minutes and weighed together with the residue to estimate the relative percentage recovery of each fraction.

EXAMPLE 2

Extraction From Muscle Tissues of Seal

Muscle tissues were trimmed from apparent non-muscle tissues. Muscle tissue samples were grinded in a meat grinder and mixed in a blender for two minutes at high speed with cold (−20° C.) acetone, in the ratio of 5 volumes of acetone per 9 of tissue. After thorough mixing, the lipids were extracted in acetone under agitation for different periods of time at 4° C. At indicated times, the solvent was separated from the mixture by filtration. The filtered solvent was recovered and the solid phase was washed again in cold (−20° C.) acetone as described above. The two solvent fractions were pooled and the extracted lipids recovered by evaporation in a Rotavapor™ apparatus. The lipid fractions were solubilized in 100 ml of ethyl acetate and recovered ("tissue lipids") after decanting overnight. Residual material was air-dried overnight at room temperature, weighed, pulverised ("protein isolate") and kept frozen at −20° C. for future enzyme analysis.

EXAMPLE 3

Extraction From Pancreas and Liver Tissues of Seal

Tissue samples were grinded and extracted as described for muscle tissues except that the lipid fraction obtained was not solubilized in ethyl acetate. The residual extract was air-dried overnight, then pulverised and kept frozen at −20° C. for future enzyme analysis.

EXAMPLE 4

Comparison Between the Efficiency of Extraction Between the Method of Folch and That of the Present Invention To compare the efficiency of the extraction process, a classical technique (Folch et al. 1957) using chloroform and methanol was applied to muscle tissue. This method is the standard method for measuring the efficiency of the extraction process. Lipid recovery was estimated by suspending lipid fractions in small volumes of their original solvents and measuring by gravimetry, small aliquots after evaporation.

EXAMPLE 5

Analysis of the Lipid Composition

To analyse the lipid composition, known amounts of each extract was loaded on silica-gel plates and fractionated by thin layer chromatography, TLC (Bowyer et al. 1962) with the following solvents: Neutral lipids: hexane, ethyl ether, acetic acid (90:10:1, v/v) and phospholipids: chloroform, methanol, water, acetic acid (80:25:2:2, v/v). Fatty acid composition of blubber and muscle oils was analysed by gas liquid chromatography, GLC (Bowyer et al. 1962) with some modifications. Briefly, an incubation of 2 h at 65° C. instead of 1 h at 80° C., and three washes with hexane instead of two and no wash with water were carried out (Beaudoin et al., 1970).

To get ride of traces of organic solvents and volatile material, lipid fractions were heated to 125° C. for about 15 minutes under inert atmosphere.

Blubber and muscle lipid extracts were characterised for: (1) iodine value according to Nagendrappa et al. (1998); (2) peroxide and saponification values, fatty acid composition, moisture and volatile material, and refractive index according to the American Oil Chemist's Society (AOCS); (3) free fatty acids according to He et al. (1999) after separation of the fatty acids by TLC.

EXAMPLE 6

Analysis of the Protein Composition

The amount of protein in the muscle tissues was estimated by the classical method of Kjeldahl. The mineral content was estimated by atomic spectrophotometry according to known methods.

Proteolytic activities were measured by the liberation of amino groups by a spectrophotometric assay using o-pthaldialdehyde as reagent. One percent homogenates of tissue extracts in 50 mM potassium phosphate buffer, pH 7.0 were incubated at 37° C. in the presence and absence of trypsin. At indicated times, trichloroacetic acid was added and the amount of amino groups was measured in the supernatant according to the method of Church et al., (1983, J Dairy Sci 66:1219–1227) except that the test was carried in microplates.

Amylolytic activities were determined according to the method of Bernfeld (1951).

CONCLUSION

The present invention therefore provides a simple and cost-effective method to obtain a marine mammal oil, rich in omega 3 fatty acids, which can then be used in numerous types of compositions, such as food supplements, to prevent or treat numerous types of conditions or disorders. Different marine mammals can be used as starting material for the purification of the oil. In a preferred embodiment, the marine mammal is a seal. In addition to having a high concentration of omega 3 fatty acids, seal also provides the advantage of being an animal which is currently hunted almost exclusively for its fur. Consequently, a lot of the seals' tissues are wasted. The present invention therefore provides a means of recycling these tissues which are often thrown away into value added products which can be beneficial, in particular to humans. The preferred tissues in accordance with the present invention comprise the blubber, the muscles and any desired organ displaying proteins and more particularly of proteins which contain a desired enzymatic activity. An example of such organs include, without being limited to, liver and pancreas. In a further embodiment, the present invention provides a second step which enables the purification of a proteinaceous fraction which is substantially pure, and which can serve as animal feed for fish, birds, mammals and the like.

Although the present invention has been described hereinabove by way of preferred embodiments thereof, it can be modified without departing from the spirit and nature of the subject invention as defined in the appended claims.

REFERENCES

Beaudoin, A. B., 1970, Métabolisme des lipides au cours du développement du Tripolium confusum Duval (coléoptère, Tenebrionidae), Ph.D. Thesis, Laval University.
Bernfeld P., 1951, Advances in Enzymol. 12:379.
Bowyer et al., 1962, BBA 70:423–431.
Church et al., 1983, J. Dairy Sci. 66:1219–1227.
Folch et al., 1957, J. Biol. Chem. 226:497–509.
Nagendrappa et al., 1998, JAOCS 75:1219–1221.

What is claimed is:

1. A method of extracting oil containing omega 3 fatty acids from a marine mammal comprising a lipid extraction step which comprises: submitting an adipose tissue from said marine mammal to a cold pressure treatment, whereby said cold pressure treatment enables the obtention of an oil containing omega 3 fatty acids and which minimizes the oxidation of polyunsaturated fats, and wherein said lipid extraction step is carried-out in the absence of an organic solvent.

2. The method of claim 1, carried-out in the absence of an added aqueous solution.

3. The method of claim 1, wherein said marine mammal is a seal.

4. The method of claim 1, wherein aid adipose tissue is blubber.

5. The method of claim 1, wherein said tissue is obtained from the carcass of said marine mammal.

6. A method of extracting protein from a marine mammal tissue, comprising:

a) a precipitation of said protein using at least one organic solvent;

b) a recovery of lipids in the liquid phase of a) by evaporation of said at least one organic solvent; and c) a recovery of said protein from said precipitate, whereby said recovered protein is substantially pure and devoid of significant levels of heavy metals or pesticides.

7. The method of claim 6, wherein said at least one solvent is selected from acetone, alcohol, ethanol and ethyl acetate.

8. The method of claim 6, wherein said recovered protein retains some enzymatic activity.

9. A marine mammal oil devoid of traces of organic solvent containing omega 3 fatty acids, obtained according to claim 1.

10. A food supplement composition, comprising said marine mammal oil of claim 9, together with a suitable carrier.

11. The method of claim 6, wherein said organic solvent is an organic solvent that is non-toxic to animals.

12. The method of claim 1, wherein said tissue is subjected to a grinding step.

13. The method of claim 12, wherein said grinding step is performed simultaneously to the cold pressure treatment.

14. The method of claim 1 wherein said marine mammal is selected from cetaceans, seals and walrus.

15. The method of claim 14, wherein said marine mammal is seal.

16. The oil of claim 9, wherein said marine mammal is selected from cetaceans, seals and walrus.

17. The oil of claim 16, wherein said marine mammal is seal.

18. The food supplement of claim 10, wherein said marine mammal is selected from cetaceans, seals and walrus.

19. The food supplement of claim 18, wherein said marine mammal is seal.

20. The method of claim 1, wherein said oil is further purified by centrifugation and/or filtration.

21. A food supplement comprising said recovered protein of claim 6.

22. The food supplement of claim 21, wherein said marine mammal is selected from cetaceans, seals and walrus.

23. The food supplement of claim 22, wherein said marine mammal is seal.

24. The method of claim 6, wherein the marine mammal tissue is a non adipose tissue.

* * * * *

UNITED STATES PATENT AND TRADEMARK OFFICE
CERTIFICATE OF CORRECTION

PATENT NO. : 6,713,447 B2
DATED : March 30, 2004
INVENTOR(S) : Adrien Beaudoin and Geneviève Martin It is certified that error appears in the above-identified patent and that said Letters Patent is hereby corrected as shown below:

Column 1,
Line 28, before "often" please delete "a"; after "often" please delete ",";
Line 37, after "typical marine" please add -- oil --;

Column 3,
Line 63, the parenthesis and its content (such as, for example, methanol)" should be deleted;

Column 4,
Line 19, before "oil", please delete "the";

Column 6,
Line 60, "Rotavaporm" should be -- Rotavapor$^{TM}$ --;

Column 7,
Table 2, "Lipid fraction"1%" and "Lipid fraction 2%" should be -- Lipid fraction 1 % -- and -- Lipid fraction 2 % -- respectively.

Signed and Sealed this

Third Day of August, 2004

JON W. DUDAS
*Acting Director of the United States Patent and Trademark Office*